Sept. 14, 1965        P. J. SNYDER        3,205,680

UNIVERSAL SPINDLE COUPLING AND THE LIKE

Filed Aug. 26, 1963        2 Sheets-Sheet 1

INVENTOR
Peter J. Snyder

Sept. 14, 1965 P. J. SNYDER 3,205,680
UNIVERSAL SPINDLE COUPLING AND THE LIKE
Filed Aug. 26, 1963 2 Sheets-Sheet 2

INVENTOR
Peter J. Snyder

United States Patent Office 3,205,680
Patented Sept. 14, 1965

3,205,680
UNIVERSAL SPINDLE COUPLING
AND THE LIKE
Peter J. Snyder, Elizabeth Township,
Allegheny County, Pa.
(6723 Smithfield St., Boston, McKeesport, Pa.)
Filed Aug. 26, 1963, Ser. No. 304,416
6 Claims. (Cl. 64—7)

This invention relates to universal spindle coupling devices and the like. More particularly, this invention pertains to relatively rugged, long-lived and troublefree universal spindle couplings for metal rolling mills, tube mills, related and associated equipment in which the axis of the driven shaft or shafts is not coincident with the axis or axes of the driving shaft or shafts.

Current universal spindle coupling devices principally in mill use are generally of the slipper or gear types. Slipper types require very precise machining, tend to be asymmetrical in operation, give rise to lubricating troubles, in the course of use often tend to be subject to objectionable pressures at the corners of the slippers and to incur undue wear and slipper breakage. Gear type couplings, on the other hand, are very expensive even when the teeth on the coupling are crowned along their respective longitudinal ridges and flanks; such gear type couplings also tend to require extreme operating precision in use and to be relatively easily damaged with resultant expenses of significant magnitude.

Shortcomings of such prior kinds of couplings will be overcome by devices made in accordance with this invention. Therein, turning forces irrespective of the angulation of the axes of the cooperating heads of a coupling are asymmetrically applied through metal sections in the respective heads which preferably withstand shear forces equally well. In all angular positions of one head in a coupling relative to the other, there is surface engagement of the pressure-transmitting parts and ready accessibility of lubricant to those parts. Such wear as occurs is on readily replaceable pressure members which transmit rotational forces uniformly with minimal wear and with dynamic balance, whether or not the universal spindle coupling of this invention is used on reversing or non-reversing mills and whether or not speed changes are encountered in the course of operation. Further, detrimental stresses between shafts are held to a minimum because of the substantial absence of whiplash effect and play. A small clearance insufficient for play is built into devices of this invention to accommodate any tendency to secanting caused by axial displacement of bearing parts in the course of rotation with the respective rotational axes of the coupling heads at an angle.

Other objects, features and advantages of this invention will be apparent from the following description and the accompanying drawings, which are illustrative only, in which FIGURE 1 is a view in side elevation of a rotational force transmitting spindle for a rolling mill, said spindle being at an angle and having one embodiment of a coupling device of this invention at each end thereof utilizing one form of lubricant cover;

Figure 1:
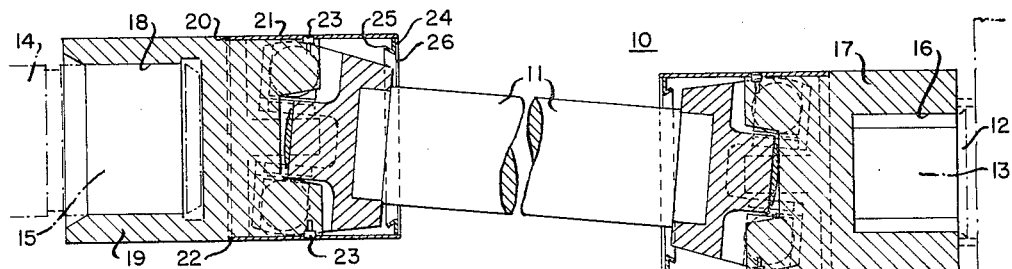
Figure 2:
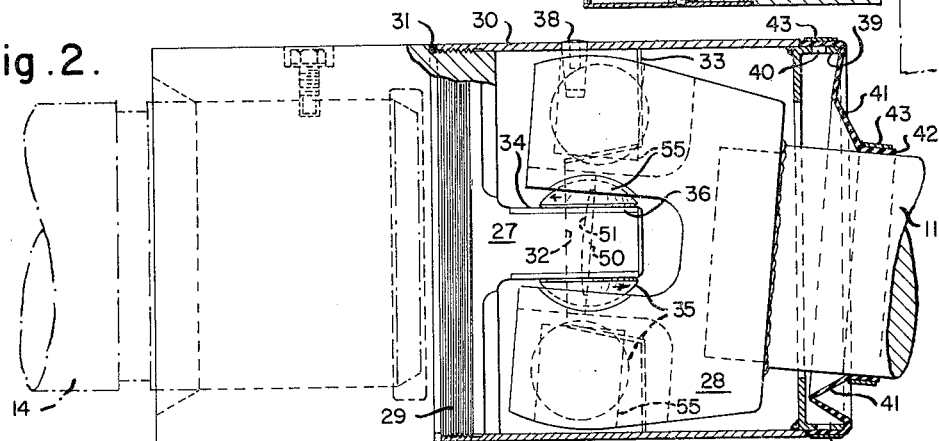
FIGURE 2 is a detail view of the coupling shown in FIGURE 1 at the mill end, somewhat enlarged, partly in section and showing a preferred form of cover which may be utilized when a fluent material is employed as a lubricant.
Figures 3, 6:
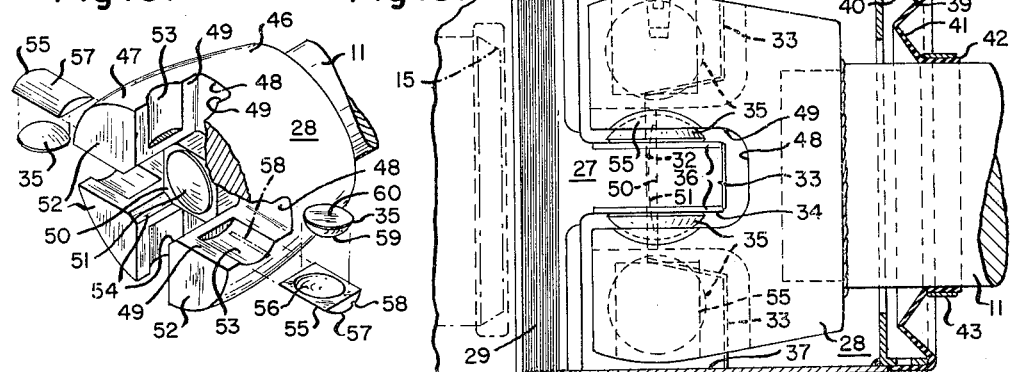
FIGURE 3 is a view of the same coupling shown in FIGURE 2 with spindle and roll axes coincident to illustrate another possible position of the coupling members when not at an angle to each other as shown in FIGURE 2.
FIGURE 6 is an isometric exploded view of the sector head of the coupling shown in FIGURE 3 with some associated parts.
Figures 4, 5:
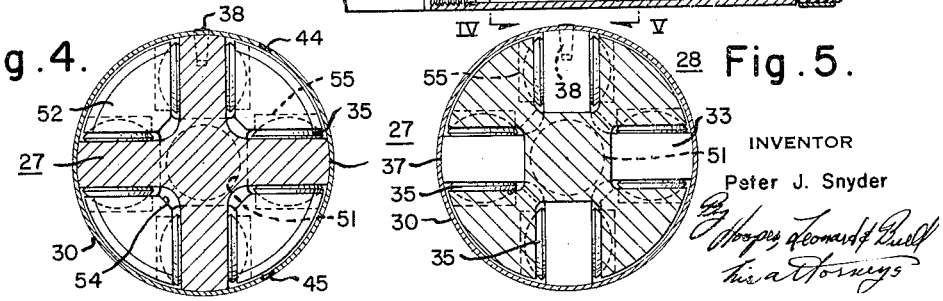
FIGURE 4 is a view partly in section, somewhat reduced, taken along line IV—IV of FIGURE 3.
FIGURE 5 is a view partly in section, somewhat reduced, taken along line V—V of FIGURE 3.

Referring to the drawings, a universal spindle coupling 10 is illustrated at each end of a driving spindle 11 used in, for example, a rolling mill to transmit power between a driving pinion shaft 12 having a necked end 13 and a roll 14 having a necked end 15. There may be two spindles one above the other, with either or both at some angle to the respective axes of rotation of the driving and driven shafts respectively. Generally in the service illustrated, the axes of the members 11, 12 and 14 will be in the same vertical plane, but such is not necessarily the case as in the event of shafts whose axes also may have a horizontal component of displacement to be rotationally connected by a spindle such as spindle 11. Each coupling 10 is a mirror image of the other, but such is not essential in that they may be similarly positioned at each end of spindle 11, somewhat better balance being obtainable when connected as shown in FIGURE 1. The neck 13 of driving shaft 12 is non-circular and fits in a correspondingly shaped recess 16 in an adapter 17. Likewise, neck 15 of driven shape 14 is non-circular in cross section to fit into a correspondingly shaped recess 18 in a driven adapter 19. A cylindrical shoulder 20 is provided on the outer heads of the respective couplings 10 onto which the adjacent edge of a cylindrical cover 21 slides, a gasket 22 being provided at shoulder 20, if desired, of soft copper or elastomeric material. Each cover 21 surrounds the parts of each coupling 10 in all positions thereof. As shown, each cover 21 is fastened by headed bolts 23 to the portion of coupling 10 which remains in axial alignment with the adjacent shaft 12 or 14, as the case may be. The open end of cover 21 is provided with an internal annular flange 24 having a reentrant inwardly turned lip 25 leaving an opening 26 through which spindle 11 extends unhindered in all positions of that spindle in service. A cover of the type of cover 21 is particularly suitable when grease is used as a lubricant. The lip flange 24–25 serves to prevent the flinging out of grease lubricant due to centrifugal action when spindles are revolving at a fairly high rate of speed. Another form of cover for a more fluent or liquid lubricant, such as oil, a molybdenumdisulfide composition, or plastic-containing types of pressure lubricants, is shown in FIGURES 2 to 4, inclusive. Other lubricants may be used than those named and, in some cases, no lubricant may be required as when force transmitting parts 35 and 55 are made of a relatively frictionless material such as "Teflon" or "Ryertex" when the transmitted pressure is not too high for such use.

The parts of each coupling 10 may be better considered from a view of FIGURES 2 to 6, inclusive. Thus each comprises a head 27 which may be an integral part of adapters 17 and 19 and to which a lubricant cover is shown affixed in the illustrated embodiment, and, a cooperating head 28 fixed by welding or otherwise to spindle 11 in that same embodiment. Head 28 is the one which in a particular operation of such embodiment has a rotational path about the axis of spindle 11 at an angle to the rotation of head 27 about the horizontal axis of shaft 14 in one of the couplings 10. The rotation of head 27 in the other coupling 10 at the lower end of spindle 11 is about the horizontal axis of shaft 12. Head 27 has a peripheral base 29 which is threaded to engage the internally threaded edge of a cylindrical cover 30 the extreme edge of which bears against a gasket 31 similar to gasket 22. Head 27 has a setback center surface 32 at right angles to the axis of rotation of head 27 and integral ribs 33 which extend radially to the perimeter of head 27. Such ribs 33 are generally rectangular in cross section normal to the axis of head 27 and also generally rectangular in end view (see FIGURES 4 and 5). Such ribs 33 are uniformly angularly spaced from each other about such center and are four in number, although a number preferably greater than two may be used. The sides 34 of each rib 33 face outwardly and comprise face surfaces on which the flat portion of spherical bearing segments 35 are adapted to bear and slide depending upon the direction of rotation in the course of a force transmitting rotational action. Such faces 34 may be surfaced with wear resistant plates 36 held to the stock of the ribs 33 by screws or bolts whose heads do not project above the surface of such wear plates. Each face 34 is opposite to a corresponding face on head 28 on the other side of the spherical bearing segment 35 between them. The peripheral surface 37 of each rib 33 is arcuate to fit within cylindrical cover 30 (cover 21 in FIGURE 1). One of the ribs 33 may be drilled to receive a tapered pin 38 to hold cover 30 against coming unscrewed from base 29 in the course of use. Cover 30 differs from cover 21 also in that at the outer end the cylindrical flange 39 of cover 30 is part of an angle bent to a circular form and welded thereto which is provided with holes 40 around the perimeter thereof for a spanner wrench to screw cover 30 into place or to remove it as and when desired. That outer flange 39 of the angle is adapted to be covered in liquid-tight fashion by the outer cylindrical edge of a flexible annular closure member 41 which may be made of oil-resistant neoprene or other flexible substance. The inner cylindrical edge 42 of closure 41 fits around spindle 11 beyond head 28 in liquid-tight fashion. The cylindrical edges of closure 41 are clamped in place by 360° band clamps 43 which may be made in the manner of hose clamps. Thereby, a fluent lubricant-tight enclosure is provided by cover 30 covering the entire heads 27 and 28 of coupling 10. When a fluent lubricant is used, it may be poured into a normally closed threaded pour opening 44 as shown in FIGURE 4 and removed from a normally plugged drain opening 45, the position of which normally closed openings changes in the course of use so that one may be used in lieu of the other depending upon the positions thereof at the time being.

Head 28 flares outwardly from its base 46 which base may fit over a reduced portion of the adjoining end of spindle 11 and be welded thereto. The outer end 47 of the periphery of head 28 preferably is longitudinally arcuate. The outer end 52 of head 28 is planar at right angles to its axis of rotation in the same manner that the outer end 33 of head 27 is planar to its axis of rotation. Head 28 is provided with radial channels 48 extending from its outer end toward base 46 with opposed sides 49 facing one another in each channel. Head 28 also has a setback center 50 on which a convex bumper 51 is affixed by welding or otherwise. The stock of head 28 between channels 48 comprises sectors 52 which are sector-like in end view and adapted to extend into the sector-like spaces between ribs 33, there being the same plurality of sectors 52 that there are ribs 33. When in axial overlapping position, rotational movement is possible by the heads 27 and 28 each about its own axis of rotation and there is interfitting in which the axial overlap of the respective ribs 33 and sectors 52 can take place in the course of use at either end of spindle 11 until center 32 nearly abuts bumper 51 as shown in FIGURE 3. Normally the position of the couplings 10 and of spindle 11 relative to the shafts 12 and 14 is such that the couplings cannot come apart, nor are both bumpers 51 in engagement with the respective centers 32 at one and the same time. In general, with the angle shown in FIGURE 1, the lower bumper 51 will tend to be the one more or less close to or in engagement with the respective center 32 at that end.

The cross-sectional area normal to the axis of rotation of the sectors 52 preferably approximates the aggregate cross-sectional area of the ribs 33 in a plane normal to their axis of rotation, for relatively equivalent strength in shear and uniform transmission of high pressure rotational forces through such respective heads usually at an angle to each other in each coupling 10. Further, the sides 49 in each channel 48 comprise opposed faces 49 in the illustrated embodiment which preferably are provided with cylindrical depressions 53 extending transversely and radially inwardly from the periphery of sectors 52 terminating outwardly of the inner chambered corner 54 of the respective sectors. Such depressions 53 are bored about an axis normal to and intersecting the axis of rotation of head 28 and midway between the faces 49, such bored axis being parallel to the faces 49. Each depression 53 is adapted to receive a cylindrical segment in the form of a bearing pad 55 having a spherical socket 56 in the outer face thereof to accommodate the spherical surface of a bearing segment 35. The opposite surface 57 of each pad 55 is cylindrical for surface engagement with the cylindrical depression 53. If desired, a keyway 58 may be provided in depression 53 and the cylindrical side of pad 55 for a headed key to keep pad 55 in its respective depression during use without any tilting or rocking about the axis of the bores 53 and with the outer flat surface flush with the faces 49. Generally, such keying would not be required inasmuch as the pads 55 tend to substantially maintain such position in use. Advantage accrues to the use of pads 55 in the course of the assembly of a coupling 10, because pad 55, like spherical bearing segments 35, may be made of a specially hardened material with relatively frictionless surfaces for ready replacement, as and when such replacement is desired, as in the case of wear plates 36, when used.

Spherical bearing segments 35 have a spherical surface 59 and a flat surface 60 respectively adapted to engage the spherical socket 56 and adjoining face of rib 33 when coupling 10 is in assembled relation. The center of the sphere represented by the spherical surfaces of a pair of sockets 56 in the pads 55 on opposite sides of a rib 33 is on the same axis as the axis of the cylindrical bores 53 on opposite sides of the same rib 33. The segments 35 substantially occupy the whole space between the opposed faces of sectors and rib on opposite sides of each of the ribs 33 except for a small aggregate clearance required by any secant action in the course of use. Such small aggregate does not provide any detrimental play in use, or any whiplash, it being too minute for such purpose, usually being less than five one-thousandths of one inch in the course of normal angulation for a rolling mill spindle coupling having a maximum angle of adjustment of about 4° above or below a horizontal axis position. The curvature of the spherical surface of bearing segment 35 is the same for all practical purposes as the radius of curvature of socket 56.

It is apparent from the foregoing that there is dynamic balance of a universal spindle coupling as described above irrespective of the direction of rotation since the device is reversible in that respect (although a one-way embodiment may be provided instead). Moreover, when in the course of rotation of head 28 adjoining sectors 52 "pivot" about a transverse axis relative to the rib 33 spanned by the channel between such sectors (see FIGURE 2), there is a tendency for the spanned bearing segments 35 to be axially displaced minutely in the direction of the small arrows shown in FIGURE 2, the small secant clearance comes into operation to tolerate the additional separation that may arise between centers of the segments 35 by virtue of such minute axial displacement therebetween. However, when the central axes of the two bearing segments 35 on opposite sides of a rib 33 are coincident, the distance between them will tend to be minutely farther than when their respective axes are so minutely displaced from one another, as occasioned during each revolution by the rotation of the two heads in a coupling 10 about different axes of rotation. At the same time, the spherical surface 59 of each segment 35 remains in surface engagement with its socket 56 and in turn in surface engagement with the surface of depression 53 due to the cylindrical surface 57 of pad 55. Consequently, irrespective of the direction of rotation, there is not only dynamic balance as aforesaid, but all force components whether axial, transverse, angular, or twisting, whether the speed is constant or varying, are accommodated with even, uniform force application distributed throughout the coupling for the achievement of relatively long life and reduced wear in the course of the severe usages to which such couplings and the like are normally put. And, the shaft ends may respectively be removed from their adapters without disturbing the couplings 10.

Figure 7:
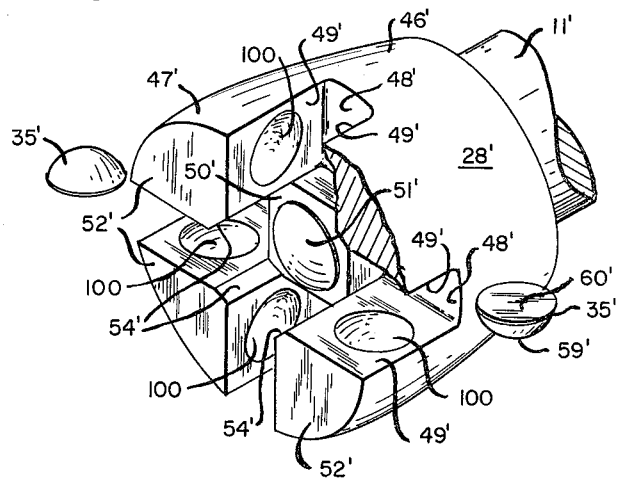
FIGURE 7 is an isometric exploded view of another embodiment of the sector head of this coupling.

FIGURE 7 is an isometric exploded view of another embodiment of the sector head of the coupling shown in FIGURE 6. The parts shown in FIGURE 7 which are identical to those in FIGURE 6 have the same reference numerals as those in FIGURE 6 with a prime suffix added. The sides 49' in each longitudinal half of the channels 48' have a spherical recess 100 which receives a spherical bearing segment 35'.

Various changes may be made in details of the illustrated coupling embodiment or the covers, and, consonant with the forces involved, the number of axial projections 33 and 52 on each cooperating head may be made either more or less than four in number.

Other embodiments of this invention may be provided without departing from the spirit of this invention or the scope of the appended claims.

I claim:
1. In a universal spindle coupling and the like, in combination, a head having a setback center and a plurality of axially extending angularly spaced sectors which are quadrantly positioned, a cooperating head having a setback center and the same plurality of axially extending angularly spaced ribs, said sectors and ribs being uniformly spaced about the axis of their respective heads and in relatively loosely interfitting axially overlapping relation, said sectors and ribs further having opposed parallel faces respectively spaced apart, said sector faces being provided with opposed cylindrical bore depressions described about an axis normal to and intersecting the longitudinal axis of said head midway between said sector faces, said depressions extending inwardly from the outer edge of said sector faces respectively, a segmental pad having a cylindrical surface to fit in each depression and a pad face adapted to be flush with its respective sector face, said pad face having a spherical recess therein described about a center on said axis about which said depressions are described, a spherical bearing segment having a spherical surface to engage said recess and a flat surface to engage the adjoining face of the adjoining rib, said bearing segments on opposite sides of each rib having a small aggregate secant clearance when their centerlines are coincident.

2. In a universal spindle coupling and the like as set forth in claim 1, comprising, a substantially leakproof cylindrical cover surrounding said heads for threaded connection to the base of one of said heads away from the spindle, the other end of said cover extending to a position adjacent the base of the other of said heads, means for rotating said heads without disturbing the leakproof character of said cover, a lubricant-resistant generally annular flexible closure for said other end of said cover, and circular clamp means for binding the outer and inner edges of said closure to said other end of said cover and said spindle respectively, whereby fluent lubricant can be used inside said cover for the lubrication of said coupling and the like.

3. In a universal spindle coupling and the like, in combination, a head having a plurality of at least three axially extending angularly spaced sectors, a cooperating head having the same plurality of axially extending angularly spaced ribs, said sectors and ribs being uniformly spaced about the axis of their respective heads and in laterally spaced interfitting and axially overlapping relation, said sectors and ribs further having opposed parallel faces respectively spaced apart, each said sector face having a spherical recess associated therewith, a spherical bearing segment having a spherical surface to engage said recess and a flat surface to engage the adjoining face of the adjoining rib, said bearing segments on opposite sides of each rib having a small aggregate clearance relative to the distance to said rib when their centerlines are coincident.

4. In a universal spindle coupling and the like, in combination, a head having a plurality of at least three axially extending angularly spaced sectors defining axially and radially extending channels having parallel sides between said sectors, a cooperating head having the same plurality of axially extending angularly spaced ribs, said ribs extending into channels in spaced relation to the sides thereof, said ribs having their sides parallel and in opposed relation to said sides of said channels respectively, one set of said sides in each channel being provided with opposed cylindrical bore depressions extending inwardly from the outer transverse edge of the set of sides having them, a pad having a cylindrical surface to fit in each depression, said pad having a spherical recess therein facing away from said depression, a spherical bearing segment having a spherical surface to engage said recess and a flat surface to engage the opposed adjacent side in that channel, said bearing segments in each channel having a small aggregate clearance relative thereto when their centerlines are coincident.

5. In a universal spindle coupling and the like, in combination, a head having a plurality of at least three axially extending angularly spaced sectors defining axially and radially extending channels having parallel sides between said sectors, a cooperating head having the same plurality of axially extending angularly spaced ribs, said ribs extending into channels in spaced relation to the sides thereof, said ribs having their sides parallel and in opposed relation to said sides of said channels respectively, one of said sides in each longitudinal half of said channels having a spherical recess, a spherical bearing segment having a spherical surface to engage said recess and a flat surface to engage the opposed adjacent side in those channels, said bearing segments in each channel having a small aggregate clearance when their centerlines are coincident.

6. In a universal spindle coupler and the like, as set forth in claim 5, comprising, a cylindrical cover surrounding said heads connected to the base of one of said heads, the other end of said cover extending to a position adjacent the base of the other of said heads, and a lubricant retaining member adjacent said other end of said cover.

References Cited by the Examiner
UNITED STATES PATENTS

| 545,085 | 8/95 | Mannesmann | 64—6 |
| 1,233,612 | 7/17 | Schreck | 64—6 |
| 1,271,905 | 7/18 | Jones | 64—6 |
| 1,316,733 | 9/19 | McGee | 64—6 |
| 1,939,653 | 12/33 | Bijur | 64—32 |

FOREIGN PATENTS

| 704,197 | 3/41 | Germany. |
| 82,368 | 1/35 | Sweden. |

BROUGHTON G. DURHAM, *Primary Examiner.*
ROBERT C. RIORDON, *Examiner.*

UNITED STATES PATENT OFFICE
CERTIFICATE OF CORRECTION

Patent No. 3,205,680                      September 14, 1965

Peter J. Snyder

It is hereby certified that error appears in the above numbered patent requiring correction and that the said Letters Patent should read as corrected below.

Column 1, line 29, for "expenses" read -- expense --; line 34, for "asymmetrically" read -- symmetrically --; column 2, line 9, for "this" read -- the --; column 4, lines 15 and 1 for "chambered" read -- chamfered --; column 5, line 70, for "beads" read -- heads --.

Signed and sealed this 15th day of March 1966.

(SEAL)
Attest:

ERNEST W. SWIDER                    EDWARD J. BRENNER
Attesting Officer                      Commissioner of Patents